Oct. 8, 1935.                C. H. CHAPIN                2,016,591
SPRING CONTROL
Filed July 21, 1932
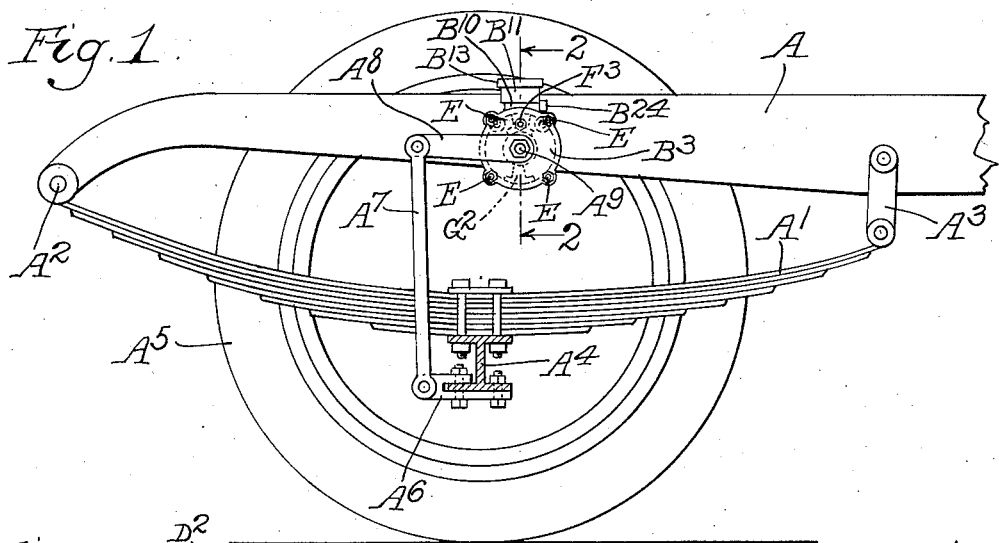
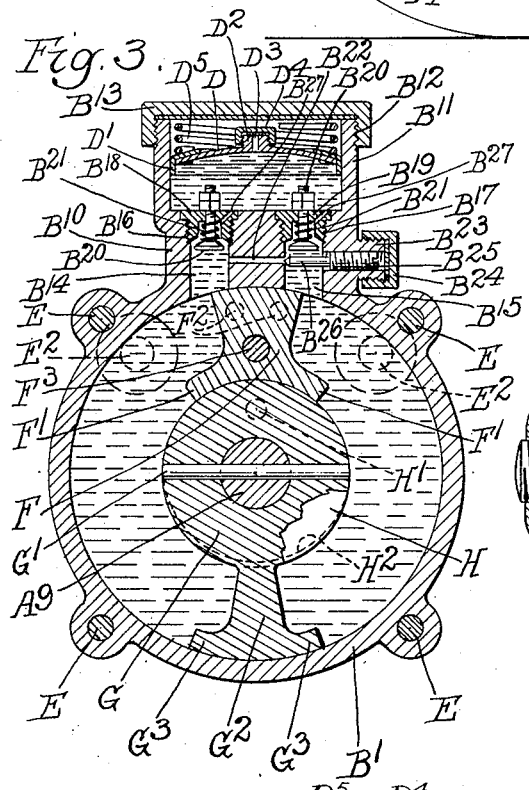
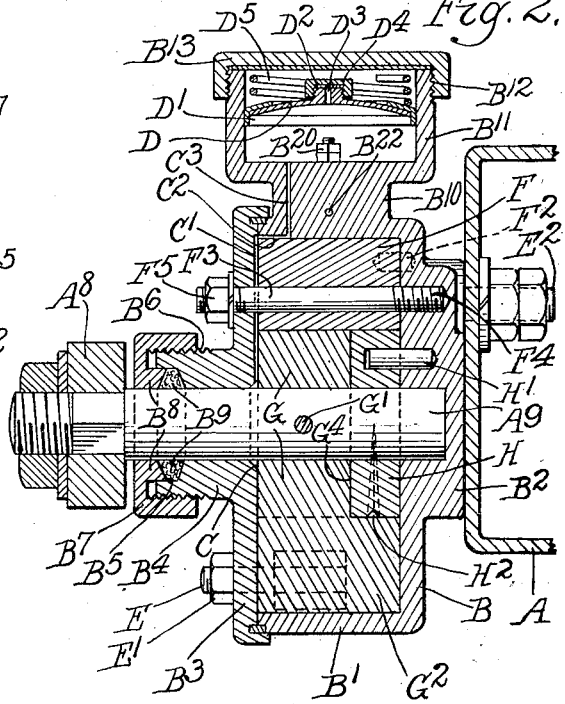
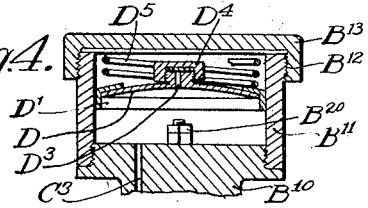
Inventor
Charles H. Chapin
by Parker + Carter
Attorneys.

Patented Oct. 8, 1935

2,016,591

UNITED STATES PATENT OFFICE 2,016,591

SPRING CONTROL

Charles H. Chapin, Chicago, Ill.

Application July 21, 1932, Serial No. 623,727

11 Claims. (Cl. 188—89)

This invention relates to a spring control device for controlling the action of the springs of a vehicle and has for one object to provide a simple and economical construction for spring control or shock absorber. Another object is to provide in connection with a hydraulic spring control having a liquid reservoir and means for controlling the movement of the liquid in the reservoir and particularly for preventing the entrance of air into the spring control proper. Another object is to provide in connection with a spring control of this general type means for equalizing fluid pressure between a plurality of chambers. Other objects will appear from time to time in the course of the specification and claims.

The invention is illustrated more or less diagrammatically in the accompanying drawing, wherein—

Figure 1 is a side elevation of one part of a vehicle frame with my spring control installed and with some parts of the vehicle in section;

Figure 2 is a transverse cross-section taken on an enlarged scale at line 2—2 of Figure 1;

Figure 3 is a cross-section taken on the plane at right angles to that of Figure 2.

Figure 4 illustrates a modified form of reservoir construction.

Like parts are designated by like characters throughout the specification and drawing.

A indicates a portion of the vehicle frame. $A^1$ is a spring fastened at one end to the frame as at $A^2$ and fastened at its other end to the frame by means of a link $A^3$. The spring is attached to an axle $A^4$ which is of any suitable design and which carries a pair of wheels $A^5$ only one of which is shown. $A^6$ is a clamping member fastened to the axle $A^4$. $A^7$ is a link pivoted at one end to the spring control lever $A^8$ and at its other end to the clamp $A^6$. The lever $A^8$ is fixed at its inner end to a shaft $A^9$ of the spring control.

The spring control or shock absorber housing may be made in almost any suitable manner and is preferably formed of two main housing parts including a plate-like member B having a flange $B^1$ which forms in effect a ring surrounding and enclosing the interior and the mechanism of the spring control. $B^2$ is a hollow boss formed on the plate member B. $B^3$ is a cover disc arranged to be fastened to the housing $BB^1$ and with it to define the chamber within the housing. The cover $B^3$ has formed upon it a more or less cylindrical boss $B^4$ which is provided with an enlargement $B^5$ in its interior to receive packing and is exteriorly threaded as at $B^6$ to receive a cover or cap member $B^7$ which is provided with an inwardly extended portion $B^8$ to contact and compress the packing $B^9$. The shaft $A^9$ is journalled in the depression or hollow in the boss $B^2$ at one end and at its other end it is journalled in the boss $B^4$. A reservoir may be formed integrally with the ring portion $B^1$ of the housing or it may be separately formed and attached thereto. This modified construction is shown in Figure 4. As therein shown the reservoir is not integral with the housing member B but is separately made and attached thereto. The arrangement of the parts is otherwise the same as that shown in Figures 2 and 3, the valve construction, the construction within the reservoir and the other parts being the same. In the particular form of the invention shown herewith the ring portion $B^1$ has an extension $B^{10}$ formed integrally with it. This extension carries a cylindrical portion $B^{11}$ which is exteriorly threaded as at $B^{12}$ to receive a closing cap $B^{13}$. The extension $B^{10}$ is ported as at $B^{14}B^{15}$. These ports are interiorly threaded and may be somewhat enlarged as at $B^{16}B^{17}$ respectively to receive valve cages $B^{18}B^{19}$ in which are mounted valves $B^{20}B^{20}$ which are normally held open by springs $B^{21}B^{21}$. A passage $B^{22}$ extends between the ports $B^{14}B^{15}$. A hollow enlargement $B^{23}$ exteriorly threaded to receive a cap $B^{24}$ is formed preferably as a part of the extension $B^{10}$. Within the hollow of the member $B^{23}$ which is interiorly threaded is movably mounted an adjusting screw $B^{25}$ which carries a needle point $B^{26}$ which lies within the port $B^{15}$ and may project to greater or less degree into the passage $B^{22}$ depending upon the adjustment of the screw $B^{25}$. $B^{27}$ are valve ports.

The housing cover $B^3$ has formed upon its inner face adjacent the opening through it a cut-away portion C which forms in effect a ring about the shaft $A^9$ as indicated in Figure 2. A groove or slot $C^1$ communicating with the portion C is cut upon the interior of the cover $B^3$. Communicating with the slot $C^1$ is a second slot $C^2$ formed on the inner face of the ring portion $B^1$. A passage $C^3$ communicates from the slot $C^2$ to the interior of the reservoir $B^{11}$. By this means leakage from within the housing member passes through the slots $C^1$ and $C^2$ through the passage $C^3$ back into the reservoir.

Movably mounted within the reservoir is a disc-like member D which may be hollow or "dished" and which may carry about its outer edge a packing member $D^1$ which may be of leather, fiber or any suitable packing material. Formed preferably adjacent the center of the member D is a hollow exteriorly threaded boss $D^2$ provided with the perforation $D^3$, running through it. A cap or closure member $D^4$ may be removably seated about the boss to close the perforation $D^3$. A helical spring $D^5$ is positioned within the hollow of the reservoir B and above the disc D. Ordinarily the spring rests upon and is in contact with the upper surface of the disc but a slight clearance is provided between the upper end of the spring and the interior face of the cap $B^{13}$ which closes the reservoir.

Any suitable means may be used for fastening together the parts which make up the housing. As shown, screws EE are used together with nuts $E^1E^1$. One or more screws or bolts $E^2$ may be used to fasten the spring control as a whole to the frame of the vehicle.

A partition member F is positioned within the housing. As shown it may have enlargements $F^1F^1$ which are shaped arcuately on their inner faces. Pins $F^2F^2$ may be used to position the partition member F and a screw $F^3$ may pass through the partition member and at one end as at $F^4$ engage the housing and at its opposite end may engage a nut $F^5$ so that this construction positions the partition and additionally strengthens and holds together the housing members.

G is a hub portion fastened upon the shaft $A^9$ for example by means of a pin $G^1$. The hub carries a paddle $G^2$ which is provided at its outer edge with enlargements $G^3$. The hub is cut away as at $G^4$ to permit a controlling disc H to fit upon the shaft $A^9$ and lie within the housing. The shaft $A^9$ moves with relation to the disc H which is pinned by a dowel or pin $H^1$ so that it is held immovable with respect to the housing. A groove $H^2$ is formed in a portion of the exterior of the disc. The groove varies in width and depth so that it is preferably of greatest width and depth adjacent its center and from the center toward both ends it develops out until it finally disappears, and throughout a portion of circumference the disc H is not grooved at all. The groove furnishes a path for fluid to pass from one side of the paddle $G^2$ to the other and as the paddle moves along the groove it uncovers the groove and thus provides a channel of escape of varying capacity to vary the resistance to movement of fluid past the paddle and consequently to vary the resistance of the motion of the paddle itself within the housing.

It will be realized that whereas I have described and shown a practical and operative device, nevertheless many changes might be made in the size, shape, number and disposition of parts without departing from the spirit of my invention. I therefore wish my description and drawing to be taken in a sense as illustrative and diagrammatic rather than as limiting me to my specific showing.

The use and operation of my invention are as follows:

The parts are assembled generally as shown and the entire interior of the housing, the ports and a portion of the reservoir are all filled with a liquid which may for example be oil, although other liquids may be used. When a suitable amount of liquid has been put into the device so that it fills a portion of the reservoir, the disc D is then inserted and is moved down until it contacts the liquid. While this is being done the cap $D^4$ is left off and thus any air under the cap escapes. The cap is pressed down until liquid begins to discharge through the opening $D^3$. This indicates that there is no air in the system because with the parts in this position air would naturally come to the top and since the valves $B^{20}B^{20}$ are held open by the springs $B^{21}$ any air in the system will escape through them into the reservoir. Thus, when all of the air has been removed and when liquid begins to escape through the opening $D^3$ the cap $D^4$ is inserted and the system is thus free from air and is sealed against the entrance of air or the escape of liquid. The spring $D^5$ is then put in place above the disc and the cap $B^{13}$ is screwed into place. A slight clearance may remain between the top of the spring and the bottom of the cap or if the spring is sufficiently yielding no clearance need be left. It is sufficient only that the parts be such as to permit a slight expansion which might occur if the temperature of the liquid within the system increases sufficiently. Thus with the system full of liquid and with air excluded the spring control device is put in position upon the vehicle. It may be mounted as shown in Figure 1 or in any other suitable fashion so that it is effected by movements of the vehicle spring. Movements of the spring toward or from the frame member A move the lever $A^8$ and the shaft $A^9$ to which the lever is secured and thus the shaft carrying the hub moves the hub and paddle either clockwise or counterclockwise as shown in Figure 3 depending upon the movement of the spring toward or from the vehicle frame. The disc H remains stationary with respect to the paddle. Movement of the paddle in the counter-clockwise direction as shown in Figure 3 creates pressure in the chamber on the right of the housing as shown in that figure and thus overcomes the action of the right hand spring $B^{21}$ and closes the valve $B^{20}$. There may or may not be a slight clearance remaining open between the needle point $B^{26}$ and the passage $B^{22}$ so that as the movement of the paddle $G^2G^3$ continues in the counter-clockwise direction some liquid may be forced through the passage $B^{22}$ and thus from the right hand to the left hand chamber as indicated in Figure 3.

Some escape of fluid of course occurs through the slot or groove $H^2$ escaping thus past the paddle $G^2$ through the groove from the right hand to the left hand chamber. Since the groove decreases in capacity from its center towards each end each added increment of movement in the counterclockwise direction moves the paddle farther along towards a shallower portion of the groove $H^2$ and thus reduces the capacity of the passage which is effective to permit the escape of liquid from one side of the paddle to the other, and of course, as the capacity of this passage decreases the resistance to further movement of the paddle in the same direction is increased. Consequently, the farther the paddle moves the greater its resistance. When the paddle reverses its direction it of course moves to uncover a portion of the groove of greater capacity and thus the resistance to its further movement is reduced until it has reached the center of the groove. Movement beyond that center in a clockwise direction will then meet with an increasing resistance.

The needle $B^{26}$ may be given any suitable setting. For some purposes it may be closed entirely, for others it may be left entirely open, or it may occupy an intermediate position extending into but not entirely closing the passage $B^{22}$.

I claim:

1. In combination in a hydraulic mechanism a main housing enclosing a chamber, a partition in said chamber, a reservoir, passages from said reservoir to each side of said partition said passages being independent of each other and an additional passage communicating with each of said first mentioned passages outside of the chamber and means for controlling the effective size of said additional passage.

2. In combination with a hydraulic spring control a housing, a fixed partition therein and a reservoir in communication with the interior of said housing, a plurality of passages leading from the interior of said reservoir to the interior of said housing, one of said passages on either side of said fixed partition, valves in said passages, means tending normally to hold said valves open, a fluid connection joining said passages and an adjustable member adapted to be moved to control the passage of liquid through said connection.

3. In combination with a hydraulic spring control a housing, a partition therein and a reservoir in communication with the interior of said housing, a plurality of passages leading from the interior of said reservoir to the interior of said housing, one of said passages on either side of said partition, valves in said passages, means tending normally to hold said valves open, a fluid connection joining said passages intermediate the housing and reservoir, and an adjustable member adapted to be moved to control the passage of liquid through said connection.

4. In combination with a hydraulic spring control a housing, a fixed partition therein and a reservoir separate from and in communication with the interior of said housing, a plurality of passages leading from the interior of said reservoir to the interior of said housing, one of said passages on either side of said fixed partition, valves in said passages, means tending normally to hold said valves open, a fluid connection joining said passages intermediate the housing and reservoir, and an adjustable member adapted to be moved to control the passage of liquid through said connection.

5. In combination in a hydraulic spring control, a housing and a reservoir in communication with said housing, the two containing liquid, and means for preventing displacement of the liquid and for preventing the entrance of air into the spring control comprising an impervious member positioned within the reservoir said member provided with a closable air-release opening.

6. In combination in a hydraulic spring control, a housing and a reservoir in communication with said housing, the two containing liquid, and means for preventing displacement of the liquid and for preventing the entrance of air into the spring control comprising an impervious member positioned within the reservoir said member provided with a closable air-release opening and being in contact with the surface of the liquid therein.

7. In combination in a hydraulic spring control, a housing and a reservoir in communication with said housing, the two containing liquid, and means for preventing displacement of the liquid and for preventing the entrance of air into the spring control comprising a movable impervious member positioned within the reservoir said member provided with a closable air-release opening and being in contact with the surface of the liquid therein, and means for yieldingly holding said member in position in contact with the liquid.

8. In combination in a spring control, a housing, a fixed partition therein, a movable partition therein, means for moving the movable partition in response to movement of the spring, a reservoir provided with a plurality of means communicating with the interior of the housing, one on each side of the fixed partition, a cover for said reservoir, liquid in the system, and means for preventing displacement of the liquid and entrance of air into the spring control proper, said means comprising a movable impervious shield positioned within the reservoir in contact with the liquid.

9. In combination in a hydraulic mechanism, a pressure chamber and a reservoir, liquid in them, a communication therebetween, a piston-like member in the reservoir, impervious to air and liquid, in contact with the liquid, an air escape passage and a closure therefor, said passage being positioned substantially at the highest liquid point in the hydraulic mechanism.

10. In combination in a shock absorber, a housing defining a pressure chamber, a movable member extending into and lying in part within the pressure chamber, that portion of the movable member which lies within the pressure chamber being imperforate, a fixed member adjacent said movable member and in contact therewith, said fixed member provided on its periphery with a groove of varying depth, placed along the path of movement of said movable member and adapted to furnish a fluid escape passage past said movable member, of varying area, said fixed member being generally ring-like in shape and coaxial with the axis of movement of the movable member.

11. In combination in a shock absorber, a housing defining a pressure chamber, a movable member extending into and lying in part within the pressure chamber, that portion of the movable member which lies within the pressure chamber being imperforate, a fixed member adjacent said movable member and in contact therewith, said fixed member provided on its periphery with a groove of varying depth, placed along the path of movement of said movable member and adapted to furnish a fluid escape passage past said movable member, of varying area, said fixed member being generally ring-like in shape and coaxial with the axis of movement of the movable member, that portion of the movable member lying within the pressure chamber being cut away to overlie the said fixed member.

CHARLES H. CHAPIN.